M. C. Gove,
Steam Trap.
No. 109,004.   Patented Nov. 8, 1870.
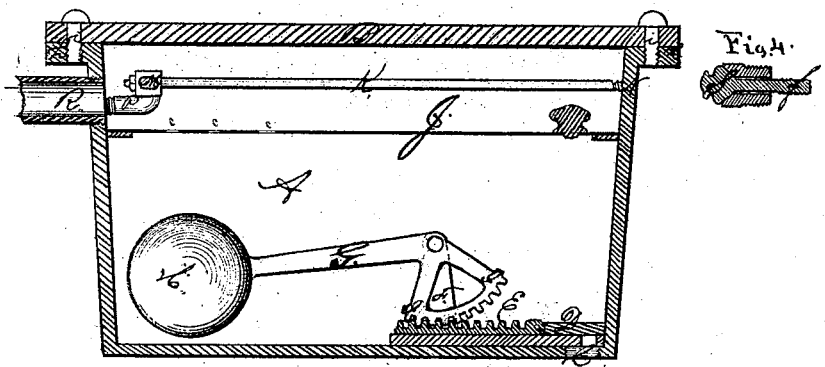
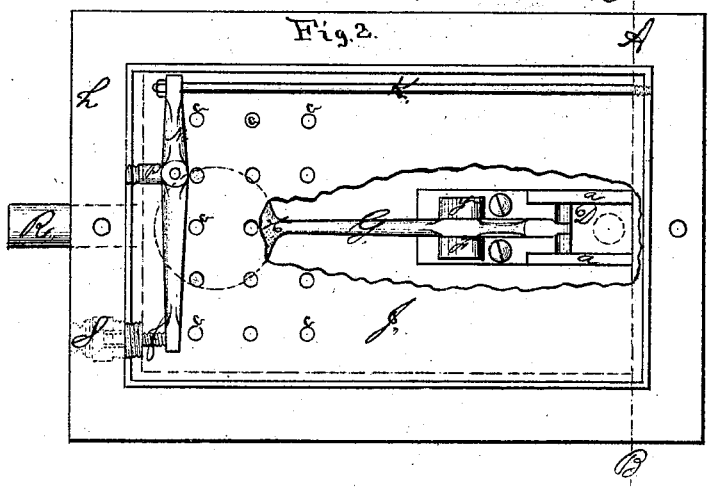
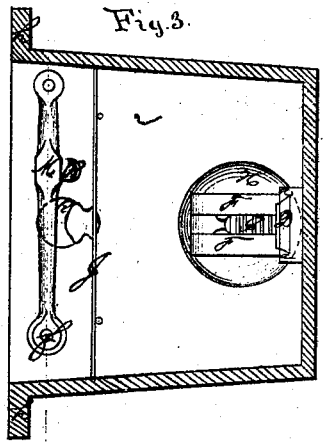
Witness
John E. Brome
Geo. H. Wight
Inventor
Morrill C. Gove

United States Patent Office.

MORRILL C. GOVE, OF LOWELL, MASSACHUSETTS.

Letters Patent No. 109,004, dated November 8, 1870.

IMPROVEMENT IN STEAM-TRAPS.

The Schedule referred to in these Letters Patent and making part of the same.

*To all to whom it may concern:*

Be it known that I, MORRILL C. GOVE, of Lowell, in the county of Middlesex and State of Massachusetts, have invented certain new and useful Improvements in Steam-Traps, of which the following is a full, clear, and exact description, reference being had to the accompanying drawing making a part of this specification, in which—

Figure 1 is a central longitudinal section.

Figure 2, a plan or top view after the cover B and a portion of the plate J have been removed.

Figure 3 is a transverse section on the dotted line A B of fig. 2.

Figure 4 represents a section of the air-valve and its seat.

This invention relates to steam-traps which are used at the end or terminus of continuous coils or lines of steam-pipes, or where the steam passes from the end of the pipe.

This invention also has for its object to liberate the air within the steam-pipes; that is, to allow the air to escape from the pipe when being filled with steam or when steam is let into the pipe, and as soon as the latter reaches the trap and fills it.

In constructing my said improved steam-trap, I first provide a suitable steam-tight case, tank, or holder A, the form of which may be varied to suit any circumstances or conditions.

This tank is closed at the top by a cover, B, secured by screws *i* to the flange *h*.

Through the bottom of the tank, at one end thereof, is an outlet, C, which is covered at times by a sliding-gate or valve, D, connected with a toothed rack, E, arranged between guides *a* or in a dovetailed groove.

Stands F rise from each side of the rack, and between these stands is pivoted a lever, G, having a segmental gear, I, the teeth of which engage with the rack to move the sliding valve.

On the opposite end of the lever is a hollow ball or float, H, which rises when the tank becomes partially filled with water from the condensed steam, and this rising motion of the float operates the segment and the rack, and slides back the valve and uncovers the outlet C, allowing the water to escape proportionate to the amount of steam condensed in the trap and the height to which the float is raised by the thus condensing steam.

Above the float, and near the top of the tank, is an expansion-rod, K, one end of which screws into the end N of the tank.

The opposite end of said rod connects with one end of a transverse lever, M, which is pivoted to a stud or bracket, P, projecting inward from the end of the tank.

The opposite end of the lever M is connected with the stem *f* of an air-valve, S, seated in the usual way.

Beneath the rod K and the lever M is a plate, J, which is supported between the sides and ends of the tank.

Perforations, *c*, are formed through this plate at one end thereof, and over the float H.

The perforations *c* allow the steam to pass through the plate into the lower part of the tank, and water may also pass through said perforations should the steam condense above the plate.

The screw-stem of the air-valve is adjustable in the end of the lever M, and when set for operation the valve is left open.

When steam is let into the pipe with which the trap is connected, the approaching steam drives the air forward through the pipe into the steam-trap and out at the air-valve, and all the air will be expelled from the pipe and from the trap by the time the latter is filled with steam.

The highly-heated steam expands the rod K, which pushes back one end of the lever M, and draws the other end inward and the valve S against its seat, thus leaving the pipe and trap free from air.

After the steam is shut off from the pipe with which the trap is connected, and after the steam has escaped from the pipe and from the trap, the rod K will contract and actuate the lever M to open the air-valve, thus leaving the trap in a condition for again letting steam into the pipe and expelling the air through the opened air-valve.

I do not claim, broadly, a float actuated by water rising in a tank for opening a valve, such a device having been used before in many forms; but

I claim as my invention—

An air-expelling or liberating steam-trap, as described, consisting of a tank or holder having an inlet, R, and an outlet, C, and provided with a toothed rack, E, a segmental gear, I, a float, H, and a valve, D, a perforated plate, J, an air-valve, S, a pivoted lever, M, and an expansion-rod, K, all combined, arranged, and operating substantially in the manner and for the purpose set forth.

MORRILL C. GOVE.

Witnesses:
JOHN E. CRANE,
GEO. H. WIGHT.